Figure 1:
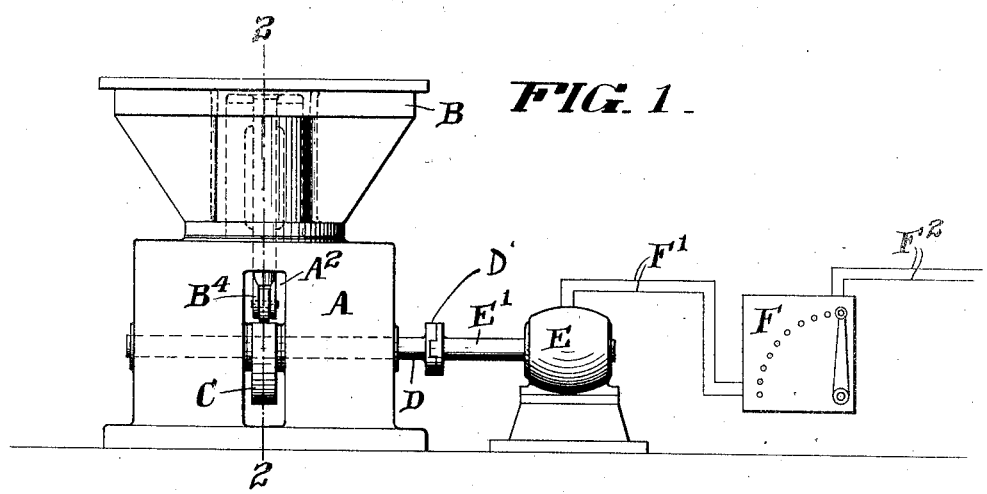

W. LEWIS.
JAR MOLDING MACHINE.
APPLICATION FILED MAR. 15, 1912.

1,113,795.

Patented Oct. 13, 1914.
4 SHEETS—SHEET 1.

WITNESSES

INVENTOR
Wilfred Lewis
BY
Francis T. Chambers
his ATTORNEY

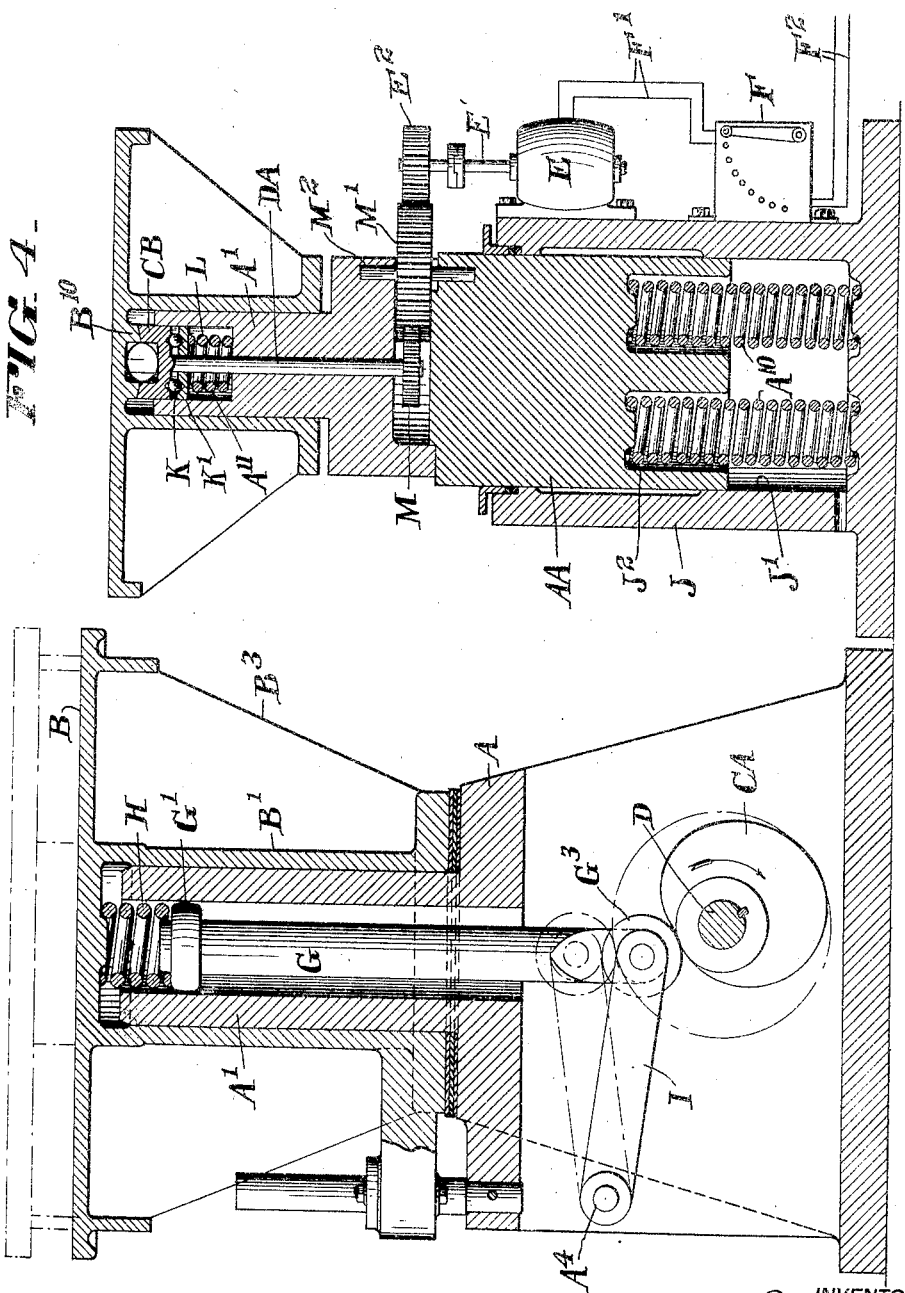

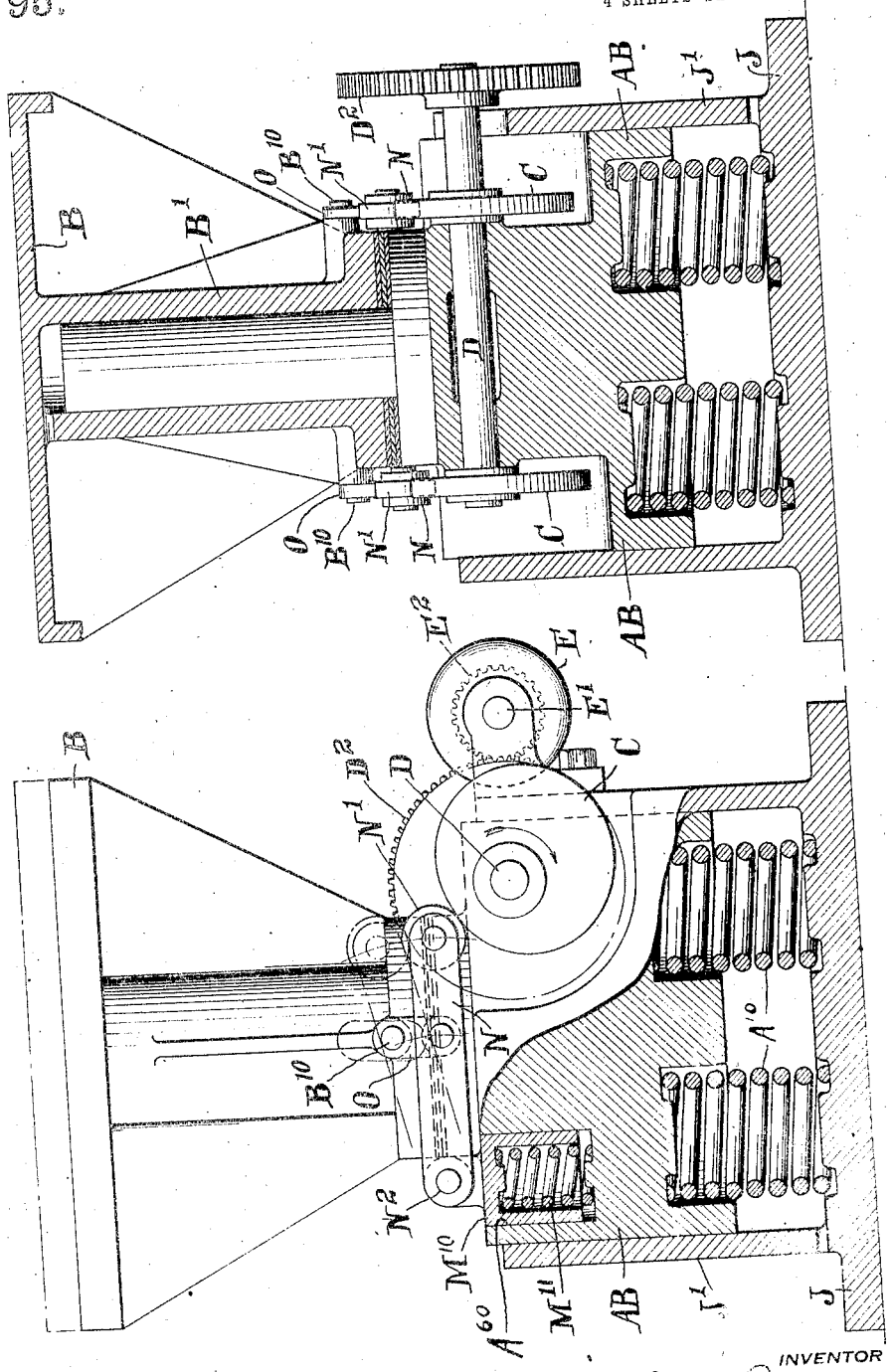

W. LEWIS.
JAR MOLDING MACHINE.
APPLICATION FILED MAR. 15, 1912.
1,113,795.
Patented Oct. 13, 1914.
4 SHEETS—SHEET 4.
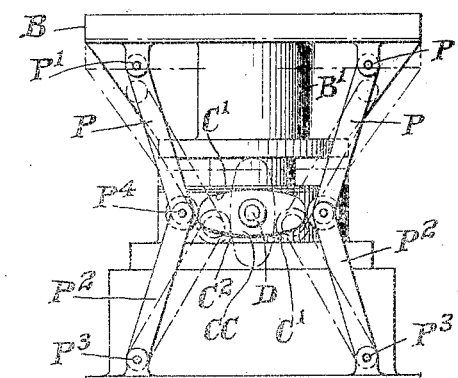
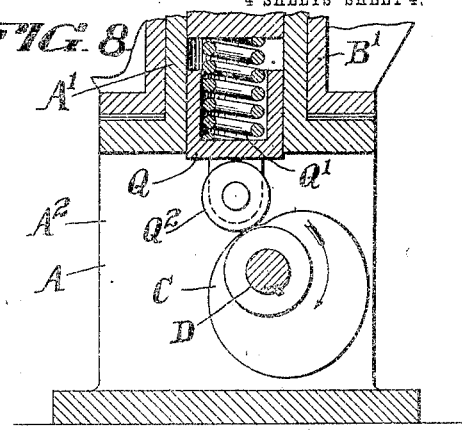
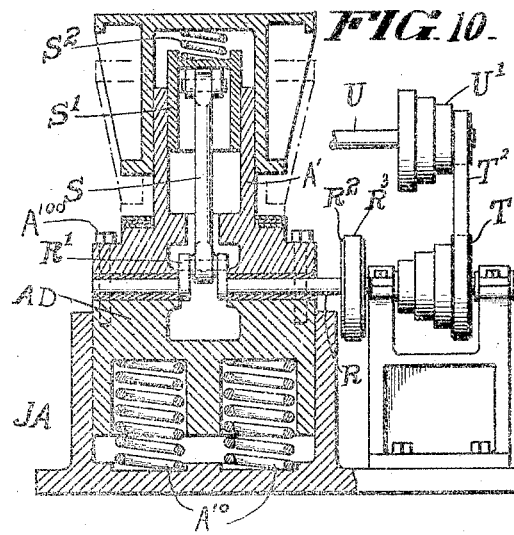
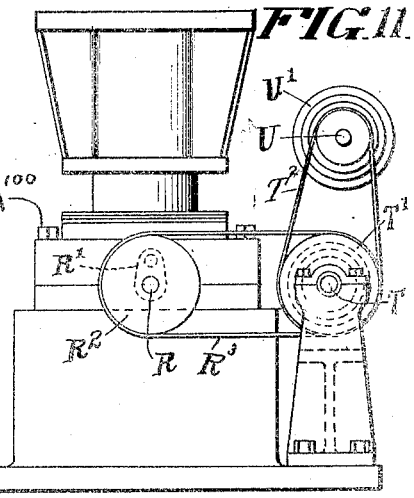
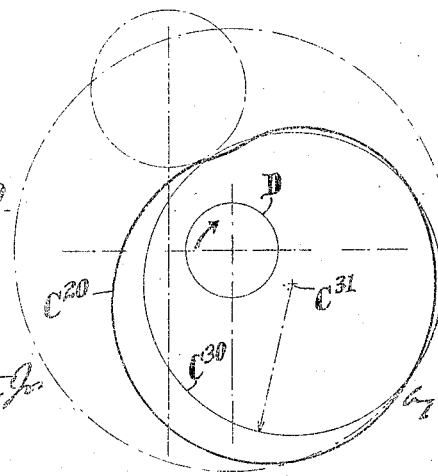

UNITED STATES PATENT OFFICE.

WILFRED LEWIS, OF PHILADELPHIA, PENNSYLVANIA, ASSIGNOR TO THE TABOR MANUFACTURING COMPANY, OF PHILADELPHIA, PENNSYLVANIA, A CORPORATION OF PENNSYLVANIA.

JAR-MOLDING MACHINE.

1,113,795.  Specification of Letters Patent.  Patented Oct. 13, 1914.

Application filed March 15, 1912. Serial No. 683,975.

*To all whom it may concern:*

Be it known that I, WILFRED LEWIS, a citizen of the United States of America, residing in the city and county of Philadelphia, in the State of Pennsylvania, have invented a certain new and useful Improvement in Jar-Molding Machines, of which the following is a true and exact description, reference being had to the accompanying drawings, which form a part thereof.

My present invention relates to molding machines of the kind known as jarrers or jar molding machines in which a mold support carrying the pattern, flask and sand or other mold forming material is first lifted above and then allowed to drop back into collision with an anvil, the shock of collision being relied upon to compact the sand or other mold forming material about the patterns. In the operation of a jar molding machine, the compacting of the sand or other mold forming material depends upon the change in velocity of the mold support on impact with the anvil and the compacting effect needs to be varied in forming molds differing in character and, also for the best effects, in forming some kinds of molds, during different stages in a single mold forming operation.

In molding machines in which compressed air or other pressure fluid is employed to elevate the mold table above the anvil, the force of the blows struck may be readily varied by varying the distance through which the mold support falls into collision with the anvil, and a similar regulation has been obtained with molding machines in which the mold table is lifted above the anvil by a cam or analogous mechanical provisions by adjusting such cam or provisions to vary the height to which the mold table is lifted preparatory to each drop.

The object of the present invention is to provide simple and effective apparatus for obtaining blows of varying intensities in the operation of jar molding machines in which the mold table is lifted a definite and invariable distance above the anvil preparatory to each collision. This I accomplish by the novel means which I employ for varying the acceleration with which the mold support approaches the anvil.

In the accompanying drawings and descriptive matter I have illustrated and described some of the many forms of apparatus by which the invention may be successfully carried out.

Figure 2:
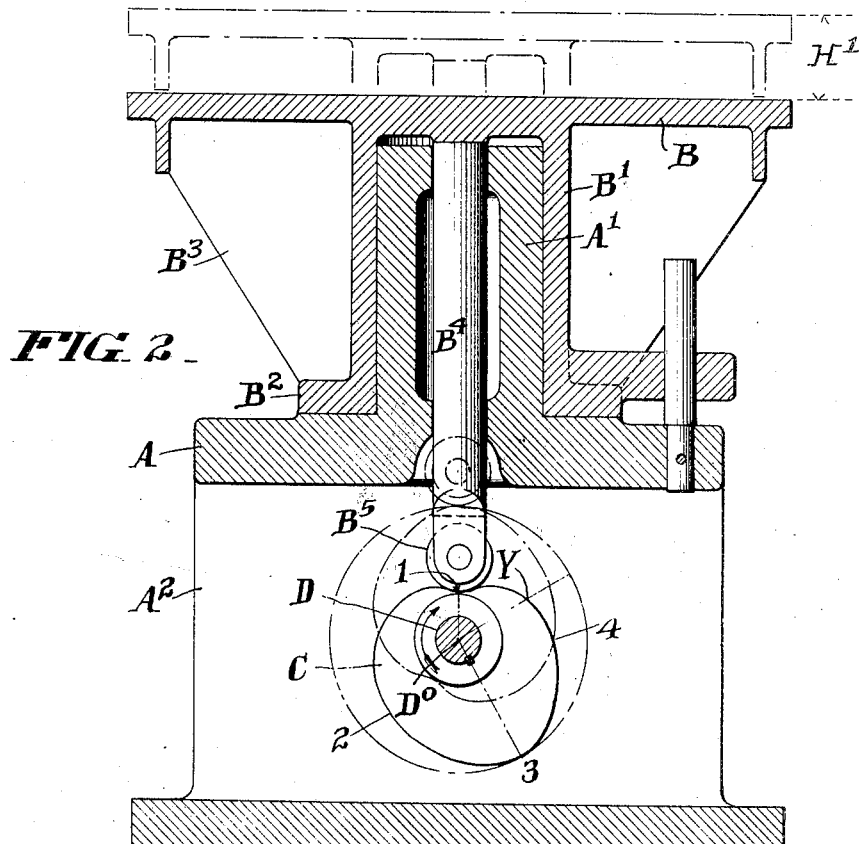

Of the drawings, Figure 1 is an elevation of a jar molding machine embodying one form of my present invention. Fig. 2 is a sectional elevation on the line 2—2 of Fig. 1. Fig. 3 is a sectional elevation taken similar to Fig. 2, showing a form of apparatus differing slightly from that shown in Figs. 1 and 2. Fig. 4 is a sectional elevation of a third form of molding machine embodying my present invention. Fig. 5 is a sectional elevation of a fourth form of molding machine embodying my present invention. Fig. 6 is an elevation taken at right angles to Fig. 5. Fig. 7 is an elevation of a molding machine embodying a fifth form of my invention. Fig. 8 is a partial sectional elevation of a molding machine differing in form slightly from that shown by Figs. 1, 2 and 3. Fig. 9 is a diagram illustrating the manner in which the rotating cam for separating and regulating the approach of the mold support and anvil may be replaced by a crank shaft and connecting rod. Fig. 10 is an elevation, partly in section, of a molding machine provided with a crank shaft and connecting rod for separating and regulating the approach of the mold support and anvil, and Fig. 11 is an elevation taken at right angles to Fig. 10.

In Figs. 1 and 2, A represents the stationary anvil of a jar molding machine, the anvil A being formed on its upper side with a sleeve-like extension $A'$ which enters and serves to guide the cylinder portion $B'$ of the mold table B. The lower end of the cylinder portion $B'$ is enlarged to form a striking portion $B^2$ which impinges against the anvil on collision, and the table proper and the cylinder portion $B'$ thereof are connected by vertical strengthening ribs $B^3$. A post $B^4$, which may be secured to the underside of the table B, and is axially disposed within the sleeve portion $A'$ of the anvil, has its lower end projecting into a vertical slot $A^2$ formed in the anvil. This slot receives a rotating cam C carried by a shaft D journaled in the anvil and connected at $D'$ to a variable speed driving shaft $E'$ which, as shown, is the armature shaft of a variable speed electric motor E.

$F'$, $F'$ represents the conductors connecting the motor E to a controller F by means of which the speed of the motor E may be varied, and $F^2$, $F^2$ designate the current supply conductors leading to the motor controller F from a suitable source of current. The post $B^4$ carries an anti-friction roll $B^5$ at its lower end. The roll $B^6$ bears against the periphery of the cam C, and the rotation of the latter alternately lifts the mold table above, and then allows it to fall back into engagement with the anvil. The cam C, in the construction shown in Figs. 1 and 2, unlike the somewhat similar cams heretofore employed for the purpose of lifting the mold table above the anvil, is not intended to move clear of the post $B^4$ after lifting the latter to the upper limit of its movement, and then remain out of engagement therewith until after the following blow is struck, but on the contrary, is intended to remain in contact with the post $B^4$ and to support a fraction of the weight of the mold support and its load during all or a portion of the falling movement of the mold table.

The peripheral portion 1—2—3 of the cam engages the end of the post $B^4$ and raises the latter from the position showing in full lines in Fig. 2 to the position shown in dotted lines in that figure in which the high point 3 of the cam is uppermost. This portion of the cam contour should be designed in the usual way to properly distribute the work of lifting the mold support and its table throughout the period of time required for the point to travel from the position shown in full lines in Fig. 2 into the position occupied by it when the cam is in the dotted line position shown in Fig. 2.

In general, in order to avoid unnecessary shock on the power transmitting mechanism I consider it desirable that the acceleration of the mold support during each drop should be uniform from the beginning to the end of the falling movement, though this uniformity is not essential, and in some cases, it may be advantageous to allow the acceleration to increase during the latter portion of the falling movement.

To obtain uniform acceleration while the arc 3—4—1 of the cam is passing at uniform angular velocity under the post $B^4$ I so shape this portion of the cam contour that in each downward movement of the mold support the distance between the highest position and any intermediate position of the mold support shall be in fixed proportion to the square of the angular movement of the cam occurring while the mold support is moving from its highest position to said intermediate position. That is to say if $h'$ represents the distance between the highest and lowest positions of the mold support, and $h$ the distance between the highest position and some intermediate position of the mold support, and if $t'$ represents the angle 3—D°—1, and $t$ the angle 3—D°—Y through which the cam turns while the mold support is moving through the distance $h$, then the relation between the quantities $h$, $h'$, $t$ and $t'$ necessary for uniform acceleration under the conditions stated is expressed by the equation $$\frac{h}{h'} = \left(\frac{t}{t'}\right)^2 \text{ or } \frac{t}{t'} = \sqrt{\frac{h}{h'}}.$$

For all values of $h$ the cam contour must be tangent to the roller on the end of the bar $B^4$, and to maintain contact between the cam and this roller it is evident that the angle $t'$ must not be traversed in less time than is required for the table to fall by gravity through the distance $$h' = \frac{g(t_o)}{2}$$

in which $g$ stands for the acceleration of gravity and $t_o$ for the minimum time during which the cam may turn through the angle $t'$. $t'$ and consequently $t_o$, thus being fixed or known, the maximum or critical speed of rotation also becomes known, and within this limit, slower speeds will give less acceleration to the table and consequently less velocity of impact against the anvil. Since this velocity is directly proportional to the speed of the cam, it follows that the ramming effect of the impact must vary as the square of the speed of rotation and that a great range in effect can be realized from a comparatively small variation in speed. It will thus be seen that by rotating the cam with the proper angular velocity the velocity of approach of the mold support and anvil at the instant of collision can be made to correspond to the velocity which the mold support would have if allowed to fall freely through any desired fraction of the maximum distance of separation between the mold support and the anvil. Thus, in the apparatus shown in Figs. 1 and 2 the mold compacting effect of the blows struck on collision may be varied as desired by varying the speed of the motor E.

In Fig. 3 I have shown a construction which I consider preferable from a practical standpoint to the somewhat simpler machine shown in Figs. 1 and 2. In Fig. 3 the connection between the cam CA and the mold support B comprises a strut G. The lower end of the strut G carries an anti-friction roll $G^3$, and is link connected to the anvil by means of the pivot $A^4$ and the link I. At its upper end the strut G has an enlarged head G', which is slidingly received in the anvil guide sleeve portion A', and a spring H is interposed between the head G' and the mold support B. In order to make the lifting action more direct I consider it advantageous to place the axis of the cam CA slightly to one side of the axis of the strut as shown in Fig. 3. The slight variation in cam contour made necessary by this lateral displacement tends to somewhat improve the contour of the cam, from a practical standpoint. The spring H, which should be under some tension in all stages of operation, manifestly tends to eliminate the transmission of objectionable shock to the cam.

The present invention is obviously not limited to use in connection with jar molding machines in which the anvil is stationary, as in the form shown in Figs. 1 and 2 and 3, but is equally useful with a machine of the "shockless" type patented in my prior Patent No. 941,999, granted November 30, 1909, in which the anvil proper is supported upon a resilient cushion and in operation is given such movements that on collision the momentum of the mold support and its load are destroyed in whole or in large part by the momentum of the anvil. In Fig. 4 I illustrate a third form of mechanism for obtaining a varied acceleration of the mold table and while this mechanism is not limited to use in a shockless machine it is well adapted for such use and is so used in the machine illustrated by Fig. 4. In Fig. 4 AA represents the anvil which is vertically movable in the cylinder J' formed in the base member J. The anvil AA is supported on springs $A^{10}$ interposed between the anvil and the base member. As shown the upper ends of these springs are received in sockets $J^2$ formed for the purpose in the anvil. In the hollow anvil extension A', a shaft DA is mounted. This shaft has secured to its upper end an end faced cam member CB which coöperates with an end faced cam member $B^{10}$ secured to the mold support. The lower end of the cam CB rests upon a ball bearing comprising balls K and a washer K'. The latter is supported by a spring L received in, and bearing against the bottom of the enlarged cavity $A^{11}$ formed in the upper end of the anvil portion A'. The shaft DA has secured to its lower end a gear wheel M which meshes with an idler gear M' journaled on a shaft $M^2$ mounted in the anvil AA. The gear wheel M' meshes in turn with a driving gear $E^2$ carried by the shaft E' of a variable speed motor E mounted on the base member J with its shaft vertical. With this arrangement the vertical movement of the anvil AA does not interfere with the operative action between the gear wheels M and M' and M' and $E^2$ since the teeth of these gears are parallel to accommodate the relative movements in the axial direction between these two gears. The gear wheel M' as shown, has its teeth elongated sufficiently to insure an operative engagement between it and the gears M and $E^2$ regardless of the ordinary up and down movements of the floating anvil AA and the movement of the shaft DA relative to the anvil as the compression of the spring L changes.

The machine shown in Figs. 5 and 6 is of the shockless kind but embraces somewhat different provisions from those shown in Fig. 4 for accommodating the relative movements between the anvil and the base without disturbing the operative connections between the cam shaft carried by the anvil and the driving motor mounted on the base. As shown in Figs. 5 and 6 the cam shaft D journaled in the anvil AB supports a cam C at each side of the anvil. Each cam C is engaged by a roll N' pivoted to one end of a lever N. The other end of each lever N is pivotally connected at $N^2$ to a plunger $M^{10}$ working in the cavity $A^{60}$ formed in the upper end of the anvil AB and supported by a spring $M^{11}$ mounted in said cavity. Between its ends each lever N is connected by a link O to a trunnion $B^{10}$ formed on the corresponding side of the mold support. The cam shaft D carries at one end a large gear wheel $D^2$ which meshes with the gear wheel $E^2$ carried by the horizontal shaft E' of a variable speed driving motor E secured to the cylinder portion J' of the base member J.

With the construction shown in Figs. 5 and 6 it will be apparent that practically the same operative advantages in the connections between the cam and mold support are obtained as are had with the construction shown in Fig. 3 and it will be apparent also that the up and down movement of the anvil within practical limits will not appreciably alter the distance between the shafts D and E', and in particular will not alter this distance sufficiently to affect the operative engagement between the gear wheels $E^2$ and $D^2$.

In order to raise the mold support various power multiplying lever and link arrangements may be employed, as for instance, the toggle arrangement shown in Fig. 7. In this figure the mold support is pivotally connected at P', P' to two similar links P. These links are pivotally connected in turn to two other links $P^2$ which are pivotally connected to the anvil at $P^3$. At the common pivotal connection between each link P and the corresponding link $P^2$ there is provided an antifriction roll $P^4$ which bears against the periphery of the operating cam CC carried on the driving shaft D. The cam CC must have its contour shaped to provide a pair of similar rising portions C' and a pair of similar descending portions C², and in the form shown, each rising portion C' and the adjacent descending portion C² coöperates with one of the rolls P⁴ during one-half turn of the shaft D in bringing about one elevation and regulating one falling movement of the mold support, and coöperates with the other roll P⁴ during the next one-half turn of the shaft to regulate a second elevation and falling movement of the mold support.

The arrangement shown in Fig. 8 differs from that shown in Fig. 3 mainly in the fact that the connecting rod-like member G and the swinging guide link I of Fig. 3 are replaced in Fig. 8 by a plunger member Q guided for simple reciprocatory movement in the mold support. The weight of the mold support is transmitted to the member Q by a spring Q' and the member Q carries an anti-friction roll Q² which rides upon the operating cam C.

It is possible to replace an ordinary cam with ascending and descending portions for separating the mold support and anvil and regulating their subsequent movement of approach in the manner hereinbefore described by a rotating crank pin or eccentric, and a connecting rod between this crank pin or eccentric and the mold support. This will be apparent from Fig. 9, in which the closed curve C²⁰ represents the outline of a cam carried by the shaft D such as the cam CA of Fig. 3. It will be observed that this curve does not depart far from a circle C³⁰ having its center at the point C³¹. This circle is so drawn moreover as to reduce its departure from the descending portion of the cam to a relatively insignificant amount. In consequence, if the shaft D were provided with an eccentric or crank pin having its center at the point C³¹ and connected to the mold support by a suitable connecting rod, the mold support would be given movements relative to the anvil in which the shaft is journaled, substantially similar to those obtained in the machine shown in Fig. 3, for instance, by the use of the shaft D, cam CA and operating connections between the cam and the mold support.

In the machine of this type shown in Figs. 10 and 11 the operating shaft R, journaled in the anvil AD, is provided with a crank R'. A connecting rod S journaled on the crank R' is pivotally connected at its upper end to a piston-like guide S' working in the central passage of the anvil extension A'. A spring S² is interposed between the piston S' and the mold support. For convenience in mounting the shaft R in the anvil, the latter is divided into two parts connected by bolts A¹⁰⁰. As shown the anvil AD is of the floating type and is mounted in a support JA similar to the support J of Fig. 4. In the machine shown in Figs. 10 and 11 the shaft R carries a pulley R² which is coupled as by the belt R³ to a pulley carried by a counter-shaft T. The latter may be driven at variable speeds from the constant speed driving shaft U by means of a belt T² coupling the pulley cones U' and T' carried by the shafts U and T respectively.

In the operation of such a machine as that shown in Figs. 10 and 11, the acceleration of approach of the mold support and anvil, in general, will not be absolutely constant throughout each movement of approach. The variation need not be large, however, and the transmission of the shock to the driving shaft due to this variation is minimized by the spring S² interposed between the crosshead S' and the mold support.

Inasmuch as a rotating eccentric or crank pin arrangement may be employed as shown in Figs. 10 and 11, in lieu of an ordinary cam to perform the same function in the same way, I intend the term "cam", used in the claims forming a part of this specification, to include such an arrangement.

In designing a machine of kind shown in Figs. 10 and 11 or indeed in designing an ordinary machine in which a cam having ascending and descending portions is employed, the parts should be so designed that any appreciable variation in the acceleration of approach of the mold support and anvil occurring during any one movement of approach, when the crank or cam shaft is rotated at a constant speed will be an increase rather than a decrease in acceleration as the movement of approach proceeds. A decrease in acceleration tends to impart a shock to the cam or crank shaft which an increase in acceleration does not. Of course, in so far as the acceleration of approach varies during any one movement of approach there is a departure from the simple relation between the speed of rotation of the shaft and the intensity of the blow struck to which reference has been made above. In any given machine however, it is a simple matter to allow for a slight departure of the kind mentioned and to obtain the desired variations in the intensities of the blows struck by properly regulating the speed of rotation of the cam or crank shaft.

While in accordance with the provisions of the statutes I have illustrated and described the best forms of my invention now known to me, those skilled in the art will understand that the invention claimed herein may be carried out by and is capable of embodiment in many forms of mechanism other than those specifically described.

Those skilled in the art will understand also that certain features of my invention may sometimes be used with advantage without a corresponding use of other features.

Having now described my invention what I claim as new and desire to secure by Letters Patent, is:

1. In a jar molding machine, the combination with the anvil and mold support, of mechanism for regulating the movement of approach of the mold support and anvil comprising a cam retarding said movement of approach.

2. In a jar molding machine, the combination with the anvil and mold support, of mechanism for regulating the movement of approach of the mold support and anvil comprising a rotating cam retarding said movement of approach.

3. In a jar molding machine, the combination with the anvil and mold support, of mechanism for regulating the movement of approach terminating in impact of the mold support and anvil comprising a rotating cam exerting a retarding force opposing the movement of approach, said cam being so shaped that the retarding force exerted by it will be substantially constant with a given speed of rotation during one movement of approach but may be varied by varying the speed of rotation of the cam.

4. In a jar molding machine, the combination with the mold support and anvil of means for separating the mold support and anvil preparatory to collision comprising a cam formed with an ascending portion for moving the mold support away from the anvil and with a descending portion for retarding the approach of the mold support and anvil whereby the intensity of the blows struck on collision may be varied by varying the speed of rotation of said cam.

5. In a jar molding machine, the combination with the anvil and mold support members, of a rotatable cam for lifting the mold support above the anvil and having a portion of its cam surface shaped to retard the falling movement of the mold support, and means for rotating said cam at variable speeds.

6. In a jar molding machine, the combination with the anvil and mold support members, of a rotatable cam for lifting the mold support above the anvil and having a portion of its cam surface shaped to constantly retard the falling movement of the mold support, and means for rotating said cam at variable speeds.

7. In a jar molding machine the combination with the mold support and anvil, of means for separating the mold support and anvil preparatory to collision comprising a cam formed with an ascending portion for moving the mold support away from the anvil and with a descending portion for retarding the approach of the mold support and anvil whereby the intensity of the blows struck on collision may be varied by varying the speed of rotation of said cam, said descending portion being so shaped that the acceleration of approach will be substantially constant through the entire movement of approach when the speed of rotation of the cam remains constant during said movement.

8. In a jar molding machine, the combination with the anvil and mold support, of mechanism for separating the mold support and anvil preparatory to collision including a cam journaled in the anvil and a spring for equalizing the reaction on the cam, said spring being subjected through the cam to a tension increasing and decreasing as the reaction on the cam increases and decreases during each separation of the mold support and anvil.

9. In a jar molding machine, the combination with the anvil and mold support, of mechanism for separating the mold support and anvil preparatory to collision including a cam journaled in the anvil and a spring interposed between the mold support and cam.

10. In a jar molding machine, the combination with the anvil and mold support of mechanism for separating the mold support and anvil preparatory to collision including a cam journaled in the anvil, an oscillating member engaged and oscillated by said cam, and thrust transmitting connections between said member and the anvil and between said member and the mold support, one of said connections including a cushion spring.

11. In a jar molding machine, the combination with the mold support and anvil, of means for separating the mold support and anvil preparatory to collision including a cam and a spring through which the separating thrust of the cam is transmitted.

12. In a jar molding machine, the combination with the anvil and mold support, of mechanism for separating the mold support and anvil preparatory to collision including a cam journaled in the anvil, a member pivotally connected to the anvil and engaged and oscillated by the cam and serving to transmit the thrust of the cam to the mold support.

13. In a jar molding machine the combination of an anvil, a mold support, a cam shaft journaled in the anvil, a cam carried thereby, a member pivoted to the anvil and engaged and oscillated by said cam, a thrust transmitting element connected to said lever, and a spring interposed between said element and the mold support.

14. In a jar molding machine, the combination of an anvil formed with a hollow vertical guide, a mold support engaging said guide, a cam shaft journaled in the anvil, a cam carried thereby, a member pivoted to the anvil and engaged and oscillated by said cam, a thrust transmitting element working in said hollow guide and connected at its lower end to said lever, and a spring interposed between the upper end of said element and the mold support.

WILFRED LEWIS.

Witnesses:
H. W. BROWN,
R. RAYMOND PORTER.